United States Patent
Lee et al.

(10) Patent No.: US 12,530,848 B2
(45) Date of Patent: Jan. 20, 2026

(54) DETAILED 3D OBJECT RECONSTRUCTION METHOD AND APPARATUS USING LAPLACIAN COORDINATES

(71) Applicant: POSTECH Research and Business Development Foundation, Pohang-si (KR)

(72) Inventors: Seung Yong Lee, Pohang-si (KR); Hyo Min Kim, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 271 days.

(21) Appl. No.: 18/396,421

(22) Filed: Dec. 26, 2023

(65) Prior Publication Data

US 2024/0212279 A1 Jun. 27, 2024

(30) Foreign Application Priority Data

Dec. 27, 2022 (KR) .................. 10-2022-0186483
Dec. 7, 2023 (KR) .................. 10-2023-0176891

(51) Int. Cl.
*G06T 17/20* (2006.01)

(52) U.S. Cl.
CPC .................. *G06T 17/20* (2013.01)

(58) Field of Classification Search
None
See application file for complete search history.

(56) References Cited

U.S. PATENT DOCUMENTS

| | | | | |
|---|---|---|---|---|
| 2005/0276518 A1* | 12/2005 | Borac | ............... | G06T 17/20 382/302 |
| 2008/0316202 A1* | 12/2008 | Zhou | ............... | G06T 17/20 345/419 |
| 2010/0111370 A1* | 5/2010 | Black | ............... | G06F 18/2321 705/26.1 |
| 2015/0002510 A1* | 1/2015 | Takayama | ............... | G06T 17/205 345/423 |
| 2022/0058873 A1* | 2/2022 | Luo | ............... | G06V 40/10 |
| 2022/0414282 A1* | 12/2022 | Wang | ............... | G06T 17/20 |

OTHER PUBLICATIONS

Suputra PH, Sensusiati AD, Yuniamo EM, Purnomo MH, Purnama Ik. 3D Laplacian surface deformation for template fitting on craniofacial reconstruction. InProceedings of the 8th International Conference on Computer and Communications Management Jul. 17, 2020 (pp. 27-32).*

(Continued)

*Primary Examiner* — Sultana M Zalalee
(74) *Attorney, Agent, or Firm* — Morgan, Lewis & Bockius LLP

(57) ABSTRACT

A detailed 3-dimensional (3D) object reconstruction method, executed by a computing device, may comprise: obtaining Laplacian coordinates with local details and direction and size information for of curvatures on a 3D surface defined by an input point cloud; and converting the Laplacian coordinates to absolute coordinates using a mesh for the 3D surface and Laplacian coordinates for each vertex of the mesh and a Laplace-Beltrami operator.

18 Claims, 13 Drawing Sheets

(56) References Cited

OTHER PUBLICATIONS

Sorkine, Olga. "Differential representations for mesh processing." Computer Graphics Forum. vol. 25. No. 4. Oxford, UK: Blackwell Publishing Ltd, 2006.*

Liang, Jian, et al. "Geometric understanding of point clouds using Laplace-Beltrami operator." 2012 IEEE conference on computer vision and pattern recognition. IEEE, 2012.*

Burov, et al., Dynamic Surface Function Networks for Clothed Human Bodies, 2021 IEEE/CVF International Conference on Computer Vision (ICCV), Montreal, QC, Canada, 2021, pp. 10754-10764.

* cited by examiner x 0.5  Original  x 1.5

DETAILED 3D OBJECT RECONSTRUCTION METHOD AND APPARATUS USING LAPLACIAN COORDINATES

CROSS-REFERENCE TO RELATED APPLICATIONS

This application claims priority to Korean Patent Application No. 10-2022-0186483, filed on Dec. 27, 2022, and Korean Patent Application No. 10-2023-0176891, filed on Dec. 7, 2023, with the Korean Intellectual Property Office (KIPO), the entire contents of each of which are hereby incorporated by reference.

BACKGROUND

1. Technical Field

The present disclosure relates to a 3-dimensional (3D) object reconstruction technology, and more particularly, to a method and apparatus for reconstructing detailed 3D objects such as clothing worn by humans and surfaces of animals or plants, with enhanced accuracy in curvature details based on Laplacian coordinates.

2. Related Art 3D reconstruction primarily aims to locate the position of the target surface to be reconstructed, typically achieved by determining the absolute coordinates for each point on the surface. In early approaches among various existing methods for 3D human reconstruction, some utilized a modeling technique representing individuals without clothing in a controllable format, optimizing pose and shape parameters from datasets to model diverse individuals and expressing variations in shape changes corresponding to different poses. Subsequently, the related technology expanded to clothed individuals using a 3D model mesh; however, the mesh of parameter-based models had a low vertex count, posing a challenge in achieving detailed representations of 3D people in previous technologies 3D model meshes.

Recently, with the advancement of deep learning, a method has been proposed to implement the surface function using a multi-layer perceptron (MLP) to estimate deformation vectors from the initial model, i.e., the surface of a person without clothes. In this method, the points affected by the deformation vectors are optimized in terms of absolute coordinates to minimize the chamfer distance with the input point cloud.

Meanwhile, when optimizing points on the surface affected by deformation vectors, using only the chamfer distance as the loss function tends to introduce noise in the resulting values. Hence, in existing techniques, it is essential to use a regularization function when performing optimization. However, while such regularization functions have the effect of removing noise and smoothing the surface of the 3D model, they come with the drawback of making the surface overly smooth, leading to the loss of details that need to be reconstructed on the surface.

In this manner, when dealing with object movements such as the motion of a person wearing clothes, which involves features like wrinkles on the surface of the object, traditional reconstruction methods based on absolute coordinates tend to miss intricate details during the reconstruction process. Therefore, there is a need for new 3D object reconstruction technology capable of solving the above problems.

SUMMARY

The present disclosure is derived to meet the demands of the prior art technology, and the purpose of this disclosure is to provide a method and device for effectively restoring a detailed three-dimensional object from an input point cloud sequence using Laplacian coordinates, which are used to represent details or modify a 3D mesh.

Another purpose of the present disclosure is to provide a method and device for effectively representing the details of a surface that varies according to human pose using Laplacian coordinate-based 3D digital human and clothing restoration.

Yet another purpose of the present disclosure is to provide a detailed 3D object restoration method and device that can effectively restore objects such as animals, plants, and things, as well as their surface details, based on Laplacian coordinates.

According to a first exemplary embodiment of the present disclosure, a detailed 3-dimensional (3D) object reconstruction method, executed by a computing device, may comprise: obtaining Laplacian coordinates with local details and direction and size information for of curvatures on a 3D surface defined by an input point cloud; and converting the Laplacian coordinates to absolute coordinates using a mesh for the 3D surface and Laplacian coordinates for each vertex of the mesh and a Laplace-Beltrami operator.

The method may further comprise obtaining a detailed mesh reflecting details of the input point cloud using a surface function modeling continuous Laplacian coordinates on the 3D surface.

The method may further comprise optimizing the surface function by transferring the 3D surface to a T-pose model, learning concave and convex shapes, and determining a direction.

The method may further comprise: estimating Laplacian coordinates in a canonical space using the surface function directly modeling continuous Laplacian coordinates on the 3D surface; and rotating the Laplacian coordinates to a pose predetermined on the 3D surface; and calculating an energy function based on the difference in rotation of the Laplacian coordinates.

The method may further comprise: estimating a deformation vector for each vertex on a template mesh based on the pose using a deformation function as a neural network; and generating a base mesh comprising deformed vertices obtained by deforming the vertices of a skinned body mesh based on the estimated deformation vector.

The method may further comprise: defining a training pair of the surface function a point on the 3D surface and a vertex on the base mesh; and approximating a Laplace-Beltrami operator through the training pair.

The method may further comprise obtaining a shape parameter and a pose parameter by performing correspondence point matching between the input point cloud and a template mesh.

The method may further comprise obtaining a skinned body mesh corresponding to a posed skinned body from the pose parameter and the shape parameter through a parametric model.

The method may further comprise deforming the skinned body mesh to fit closely to a give point cloud.

The method may further comprise obtaining a base mesh comprising deformed vertices resulting from the deformation from the 3D surface.

The method may further comprise obtaining a surface function by rotating the Laplacian coordinates, obtained on the parametric model, through linear blend skinning.

The method may further comprise constructing a neural surface Laplacian function defined on the surface of the base mash to reflect the fine-level detail of the input point cloud as much as possible in reconstruction.

The method may further comprise projecting each point of the input point cloud onto the base mesh to obtain query points in the input point cloud.

The method may further comprise optimizing the total energy, obtained by summing point-wise energy of randomly sampled input points, through an Adam optimizer.

The method may further comprise obtaining the base mesh for a given pose and the Laplacian coordinates for each point on the surface of the base mesh after the optimizing; and obtaining final vertex positions by inversely transforming the Laplacian coordinates.

According to a second exemplary embodiment of the present disclosure, a detailed 3-dimensional object reconstruction apparatus may comprise: an estimation module configured to obtain Laplacian coordinates with local details and direction and size information for of curvatures on a 3D surface defined by an input point cloud; and a reconstruction module configured to convert the Laplacian coordinates to absolute coordinates using a mesh for the 3D surface and Laplacian coordinates for each vertex of the mesh and a Laplace-Beltrami operator.

The reconstruction module may obtain a detailed mesh reflecting details of the input point cloud using a surface function modeling continuous Laplacian coordinates on the 3D surface.

The surface function may be obtained by rotating the Laplacian coordinates, obtained on a T-pose model, through linear blend skinning.

The reconstruction module may optimize the surface function by rotating the Laplacian coordinates with a pose predetermined on the 3D surface and calculate an energy function based on the difference in rotation of the Laplacian coordinates.

The estimation module may estimate a deformation vector for each vertex on a template mesh based on a pose using a deformation function as a neural network and generate a base mesh comprising deformed vertices obtained by deforming the vertices of a skinned body mesh based on the estimated deformation vector.

According to the present disclosure, it is possible to effectively reconstruct a 3D digital human and clothing from a given point cloud sequence using Laplacian coordinates, which are used for representing detailed features and modifying 3D meshes.

According to the present disclosure, it is also possible to effectively represent the surface details varying with the pose of the person using the Laplacian coordinates-based 3D digital humans and clothing reconstruction technology.

According to the present disclosure, the Laplacian coordinates-based detailed 3D object reconstruction method and apparatus is capable of achieving higher performance in reconstructing intricate details compared to existing technologies and is applicable to various purposes such as detailed transfer, smoothing, sharpening, shape manipulation, and the like via the modification or transmission of Laplacian coordinates.

DETAILED DESCRIPTION

Figure 1:
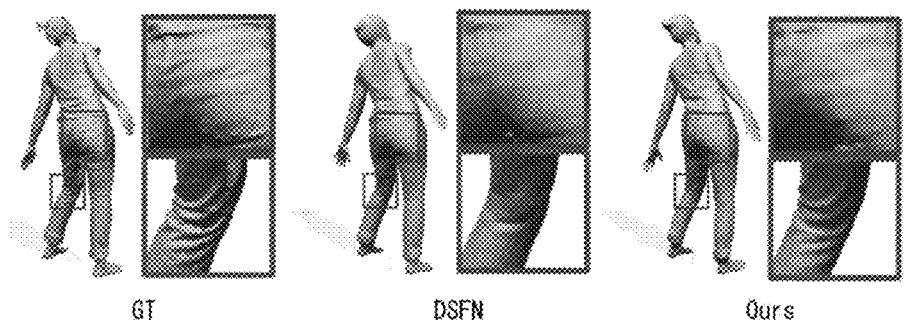
FIG. 1 is a diagram illustrating a qualitative comparison between a detailed 3D object reconstruction method in the present disclosure (briefly referred to as 'reconstruction method') and a comparative example (DSFN).

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Before describing the Laplacian coordinates-based detailed 3D object reconstruction system in this disclosure, the relevant terminology and associated processes are explained first.

Human Body Model

Parametric models based on principal component analysis (PCA) are proposed to handle human body and pose variations. The parametric models encompass the skinned multi-person linear (SMPL) model, generative human model (GHUM), and Frank model. These parametric models handle the deformation of body shape and pose, which cannot be modeled by general models, using linear blend skinning (LBS). Parametric models are suitable for representing the shape of the human body with coarse meshes but are not sufficient on their own to capture rich details in the human body.

Clothed Human Model

Several approaches for extending parametric human models are additionally proposed. Among various approaches, the SMPL model is extended to directly incorporate displacement vectors at each vertex to represent clothed deformations. Additionally, the 3D CAPE model generates realistic clothing structures by utilizing the learned latent space when provided with human body shape, pose, and clothing type by the SMPL model. In another model, an additional parametric model is employed to represent clothing on top of the human model, and a normal map based on a generative adversarial network (GAN) is used to express surface details. However, existing approaches in the technology for clothed human models are limited in their reconstruction capabilities to predefined clothing items and cannot effectively reconstruct human shapes with arbitrary clothing details from input scan data.

Implicit Representation of Clothed Humans

The implicit representation for clothed human may be broadly categorized into volumetric implicit representation and neural implicit representation. Among them, in neural implicit representation, neural parametric models have been proposed for modeling shape and pose deformations. The neural parametric models are proposed to learn pose-dependent deformations using part-separate implicit functions, to learn parametric models that can recover shape and pose parameters for SMPL model, or to encode shape and pose variations into two disentangled latent spaces using autodecoders.

However, although possible to handle changing human body shapes such as loose clothing without a topology for the clothed human body, these implicit representations are limited in ability to provide temporally consistent mesh topology required for real-time processing in animations requiring reconstruction of the shape of clothed human bodies individually for each frame and to handle the computationally intensive dense point sampling of 3D volumes required by the training of functions or models for implicit representations.

Explicit Representation of Clothed Humans

Explicit representations for reconstructing clothed humans have been developed mainly for handling geometric details on the template mesh of a parametric model such as the SMPL model. These explicit representations may be classified into point-based and mesh-based approaches.

Point-based explicit representations are employed to reconstruct controllable clothed human shapes by representing local details with a set of points sampled on surface patches. To avoid artifacts of the patch-based approach at patch boundaries, the specific prior art represents local details using point samples on a global 2-dimensional (2D) map. Point cloud representation has a flexible topology and can cover more geometric details. However, this representation does not provide an explicit output mesh.

Further, mesh-based explicit representation can be used for subject-specific human reconstruction with depth sequences. For example, models based on dynamic surface function network (DSFN) represent surface details using vertex offsets on a finer resolution mesh obtained by subdividing the template mesh of the SMPL model (briefly referred to as 'the SMLP template mesh'). However, using static offsets for reconstructing surface details of the human body has only a slight effect, which is practically negligible.

Hereinafter, preferred embodiments of the present invention are described with reference to the accompanying drawings in detail. In order to facilitate a comprehensive understanding of the present invention, the same reference numerals are used for identical components in the drawings, and redundant explanations for the same components are omitted.

The detailed 3D object reconstruction system described in this disclosure (hereinafter briefly referred to as 'reconstruction system') is based on Laplacian coordinates. The reconstruction system obtains Laplacian coordinates from the input point cloud and efficiently reconstruct a detailed 3D object with surface details using these coordinates. The reconstruction system may refer to a detailed 3D object reconstruction apparatus briefly referred to as 'reconstruction apparatus') equipped with a computing device or corresponding means that implements the detailed 3D object reconstruction method (briefly referred to as 'reconstruction method').

In this disclosure, a system may be provided for reconstructing 3D digital humans and clothing from a given point cloud sequence using Laplacian coordinates. Laplacian coordinates, a well-known type of differential coordinates, are utilized in tasks such as 3D mesh modification, and includes fundamental information about intricate details on the 3D surface.

Meanwhile, clothed humans exhibit surface details such as wrinkles changing with movement, and traditional reconstruction methods based on absolute coordinates tend to miss intricate details during the reconstruction process. Therefore, this disclosure is based on the idea that Laplacian coordinates, specialized for representing detailed features, can be highly effective in expressing such details in the context of 3D reconstruction. To leverage these characteristics, the reconstruction system is structured with steps including 3D surface function optimization and Laplacian coordinate integration.

The 3D surface function takes as input the position of a point on the surface of the human body and the pose parameters and outputs Laplace coordinates, which effectively expresses the details of the surface that change depending on the person's pose, such as the wrinkles of clothing. After the completion of surface function optimization, the reconstruction system may integrate the Laplacian coordinates of the estimated human body surface for a specific pose to reconstruct the final shape. The reconstruction system in this disclosure is capable of achieving better performance in reconstructing intricate details compared to existing reconstruction methods and is applicable to various shape manipulations through the modification of Laplacian coordinates.

Figure 2:
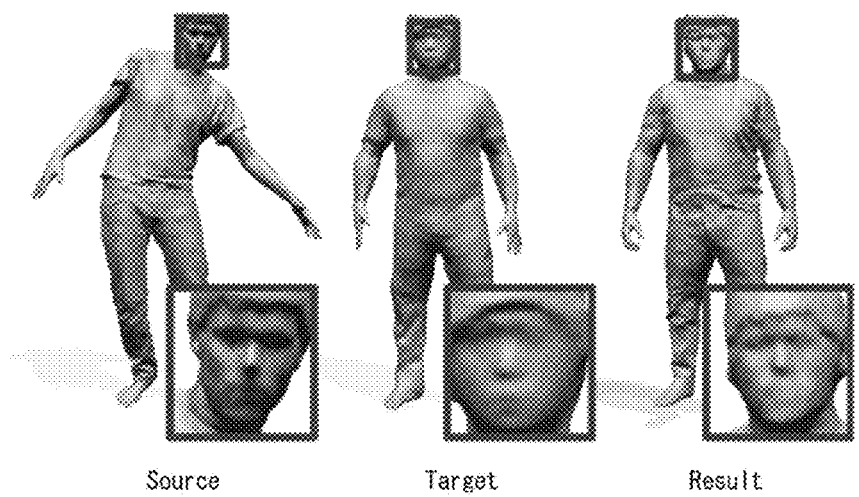
FIG. 2 is a diagram illustrating detailed transfer results by the reconstruction method in the present disclosure.
Figure 3:
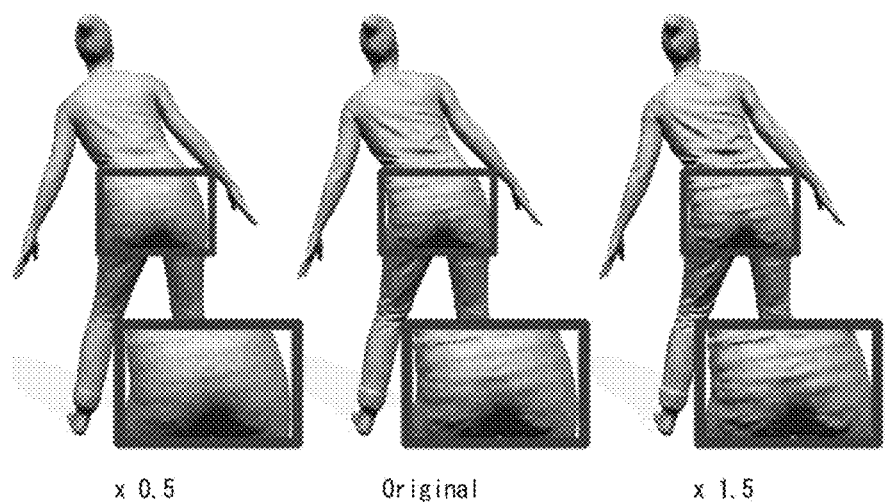
FIG. 3 is a diagram illustrating the smoothing and sharpening functions employed by a reconstruction method in the present disclosure.

FIG. 1 is a diagram illustrating a qualitative comparison between a detailed 3D object reconstruction method in this disclosure (briefly referred to as 'reconstruction method') and a comparative example (DSFN). FIG. 2 is a diagram illustrating detailed transfer results by the reconstruction method in this disclosure. FIG. 3 is a diagram illustrating the smoothing and sharpening functions employed by a reconstruction method in this disclosure.

The reconstruction results of the reconstruction method of the present embodiment (Ours) and the construction results of the conventional template-based reconstruction method (DSFN) are compared with the ground truth (GT) as shown in FIG. 1 and Table 1.

The conventional reconstruction method is based on the dynamic surface function network (DSFN) proposed by Burov et al. in 2021 for clothed human bodies.

As can be confirmed from the comparison of the qualitative results in FIG. 1 and the comparison of the quantitative results and computational amounts in Table 1, the reconstruction methods of the present embodiment (Ours) exhibit visually and quantitatively better results than the conventional reconstruction method (DSFN).

TABLE 1

| Method | IoU↑ | dCD(cm)↓ | NC↑ |
|---|---|---|---|
| DSFN | 0.832 | 1.56 | 0.917 |
| Ours (same vertex density as DSFN) | 0.863 | 0.99 | 0.933 |
| Ours | 0.871 | 0.94 | 0.941 |

In Table 1, one of the two reconstruction methods of the present embodiment (Ours) has the same vertex density as the conventional reconstruction method (DSFN).

The reconstruction methods in this disclosure may be configured to modify estimated Laplacian coordinates for various shape manipulations. For example, it possible to perform detail transfer by transferring the Laplacian coordinates of one model to the base mesh of another model (refer to FIG. 2) or decrease or increase the number of Laplacian coordinates to achieve smoothing or sharpening effects (refer to FIG. 3).

FIG. 2 illustrates the detail transfer transferring the details from the source model to the target model by transferring Laplacian coordinates of the source model to the base mesh of the target model. As shown in FIG. 2, it is evident that the details on the face image of the target model have been enhanced.

Additionally, FIG. 3 illustrates the smoothing effect of reducing the size of the Laplace coordinates from the original (Original) by 0.5 times (×0.5) and the sharpening effect of increasing the size of the Laplace coordinates from the original (Original) by 1.5 times (×0.5).

The mentioned Laplacian coordinates are values expressed as the product of curvature and normal vectors at a vertex on a 3D surface and are typically defined in a mesh representation of the surface as the difference between the position of a vertex and the average position of neighboring vertices. Here, Laplacian coordinates may represent the differential quantities in mesh editing used to encode vertex coordinates on the mesh.

Mesh editing based on Laplacian coordinates may include three steps: encoding Laplacian coordinates from the original mesh, performing interactive editing for interaction of control points, and transforming Laplacian coordinates satisfying the position constraints imposed by the edited control points into absolute vertex positions, i.e., absolute coordinates on the target mesh.

The encoding step, interactive editing step, and transformation step constituting the mesh editing are described together. In the following, the mesh may be represented as a set of vertex sets and triangle sets.

Let a original mesh M={V, F} be described by the vertex set V and the triangle set F, where V={$v_k$|k=1, ..., K}. $v_k$ denotes the position of the k-th vertex and K is the number of vertices. Uniform Laplacian coordinates $\hat{\delta}_k$ calculated at each vertex of the original mesh are defined as Equation 1. The original mesh is formed by the vertices of the input point cloud and may correspond to the raw mesh.

$$\hat{\delta}_k = \sum_{j \in \mathcal{N}(k)} \hat{w}_k (v_k - v_j), \hat{w}_k = \frac{1}{|\mathcal{N}(k)|} \quad \text{[Equation 1]}$$

In Equation 1, $v_k$ denotes the position or coordinates of the k-th vertex within the vertex set with K vertices, and $\mathcal{N}(k)$ denotes the set of adjacent vertices of the k-th vertex or the index of the corresponding set of the adjacent vertices. k indicates a natural number from 1 to K, which is the total number of vertices. $\hat{w}_k$ indicates uniform weights and is defined as $$\frac{1}{|\mathcal{N}(k)|}.$$

According to Equation 1, regarding all vertices, since $\mathcal{N}(k)$ is uniformly calculated, it is possible to calculate uniform Laplacian coordinates when the mesh connectivity can be obtained. The uniform Laplacian coordinates obtained from Equation 1 may be expressed in a matrix form as shown in Equation 2.

$$[\hat{\delta}_1, \ldots, \hat{\delta}_K]^T = \hat{L}[v_1, \ldots, v_K]^T \qquad \text{[Equation 2]}$$

In Equation 2, L is the uniform Laplacian matrix. Notably, matrix L has rank K−1. That is, $\hat{L}$ is the uniform Laplacian matrix composed of the connectivity of one vertex and the set $\mathcal{N}(k)$ of adjacent vertices of the one vertex and the weight $\hat{w}_k$ mentioned in Equation 1. Therefore, $\{\hat{\delta}_k\}$ can be converted into V by taking the specified position of a selected vertex as the boundary condition and solving a linear system. In other words, Laplacian coordinates for all vertices of the mesh may be inverse-transformed into absolute coordinates through matrix multiplication with the inverse matrix. For example, when fixing the i-th vertex, we can form a sparse linear system Ax=b, where A=$[L^T, 1_i]^T$ and b=$[\delta_1, \ldots, \delta_k, v_i]^T$. $1_i$ denotes one-hot encoding, where the i-th element is one.

In this disclosure, the input scan data of the computing device that performs the detailed 3D object reconstruction method may be a sequence of point clouds $\{P_t\}_{t=\{1, \ldots, T\}}$. The input scan data may include 2.5D depth map or 3D full scan data of a clothed human body with motion, and the point cloud may be referred as an input point cloud, point clouds or point cloud data.

On the other hand, in the case of point clouds, Equation 1 and Equation 2 cannot be directly used to compute Laplacian coordinates. Instead, an approximation method may be used for Laplacian coordinates. The Laplace-Beltrami operator for the approximation method may compute Laplacian coordinates using a continuous function that reflects the non-uniform local shape in the neighborhood, which differs from the discrete uniform Laplacian coordinates in Eq. 1. Therefore, Laplacian coordinates calculated by the Laplace-Beltrami operator need to be converted into mesh's vertex positions differently.

Figure 4:
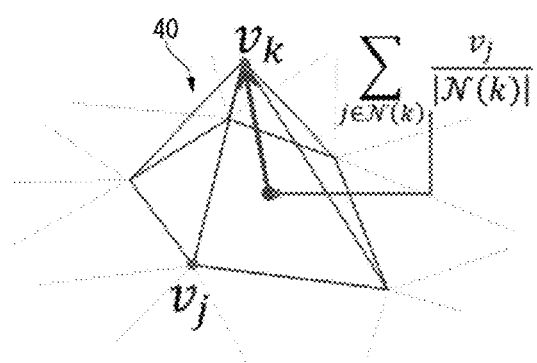
FIG. 4 is a diagram illustrating Laplacian coordinates capable of being computed from a mesh and a point cloud as a process of adopting the reconstruction method of the present embodiment.
Figure 5:
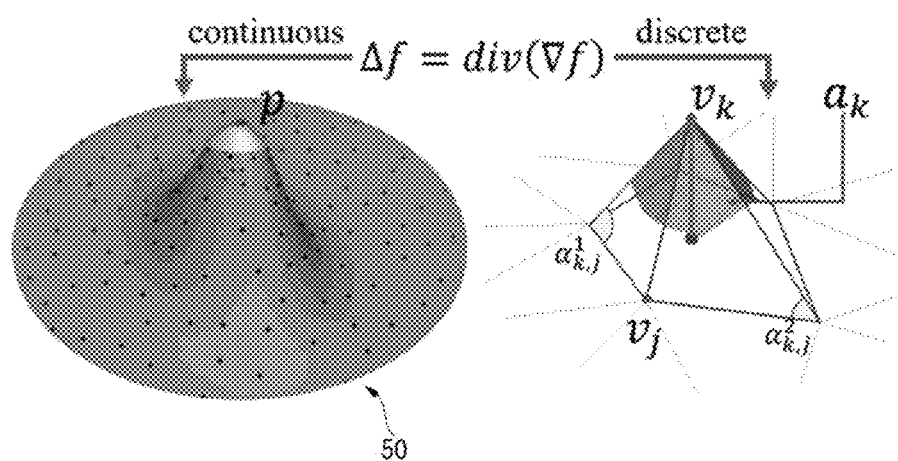
FIG. 5 is a diagram illustrating a process of calculating the Laplacian coordinates of FIG. 4.

FIG. 4 is a diagram illustrating Laplacian coordinates capable of being computed from a mesh and a point cloud as a process of adopting the reconstruction method of the present embodiment. FIG. 5 is a diagram illustrating a process of calculating the Laplacian coordinates of FIG. 4.

The approximation method for Laplacian coordinates involves locally fitting a quadratic surface function to each vertex of the mesh 40 as shown in FIG. 4 and then using the derivative values of the quadratic function to compute the Laplacian coordinates. Here, the computed Laplacian coordinates may be equal to the values calculated using the Laplace-Beltrami operator on the mesh 40. In the mesh 40, the uniform Laplacian coordinates $\delta_{u,k}$ for each vertex $v_k$ may be succinctly expressed, taking into account neighboring vertices $v_j$, as shown in the simplified form of Equation 3.

$$\delta_{u,k} = \sum_{j \in \mathcal{N}(k)} \frac{v_j}{|\mathcal{N}(k)|} \qquad \text{[Equation 3]}$$

That is, Laplacian coordinates may be computed from raw 3D scan data, and the calculated Laplacian coordinates may be utilized for shape detail reconstruction. In this case, since the point cloud does not have edge connectivity, an alternative approach to Equation 1 is needed to compute Laplacian coordinates. For example, although creating edges directly from the point set of the point cloud can be considered, it may result in a noisy and un-fragmented mesh.

Accordingly, as shown in FIG. 5, it is possible to define the Laplace-Beltrami operator 50 by fitting a quadratic function $\Delta f$ to the local neighboring vertices of each vertex in the mesh 40 of the point cloud and computing the derivative div($\nabla f$) of the quadratic function. The Laplace-Beltrami operator 50 may be a discrete Laplace-Beltrami operator.

In the mesh 40, the Laplace-Beltrami operator 50 may be computed as Equation 4.

$$\delta_k = \frac{1}{a_k} \sum_{j \in \mathcal{N}(k)} w_k(v_k - v_j), \; w_k = \frac{\cot(\alpha^1_{k,j}) + \cot(\alpha^2_{k,j})}{2} \qquad \text{[Equation 4]}$$

In Equation 4, $\delta_k$ is the non-uniform Laplacian coordinates, $a_k$ is the Voronoi area of the k-th vertex $v_k$ in the vertex set, and $a_{k,j}^1$ and $a_{k,j}^2$ are the two angles opposite to the edge {k, j} that connects the k-th vertex and the j-th vertex adjacent to the k-th vertex in the triangle adjacent to the edge, respectively.

As evident from Equations 1 and 4, unlike the aforementioned Laplacian coordinates, the Voronoi area $a_k$ and weights $w_k$ are not uniformly determined. Therefore, assuming that only these weights can be appropriately determined, it is possible to represent all vertices on the mesh in a matrix form as Equation 5 similar to the approximation method described above.

$$[\delta_1, \ldots, \delta_k]^T = L[v_1, \ldots, v_K]^T \qquad \text{[Equation 5]}$$

In addition, when the Laplacian coordinates at all vertices are given as shown in Equation 5, it is possible to perform inverse transformation by solving a linear equation as Equation 6.

$$Ax = b, \; A = [L^T, 1_i]^T, \; b = [\delta_1, \ldots, \delta_k, v_i]^T \qquad \text{[Equation 6]}$$

In Equation 6, $1_i$ denotes a vector with only the i-th value being 1 and the others being 0, where i is the index of the fixed vertex. The solution x of the linear equation of Equation 6 represents each of the coordinates of those vertices.

Figure 6:
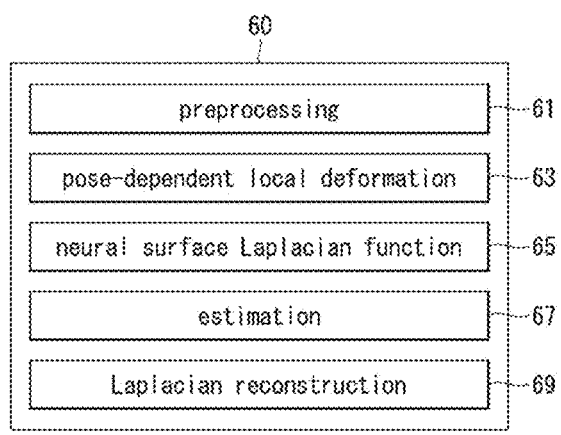
FIG. 6 is a flowchart illustrating a detailed 3D object reconstruction method (briefly referred to as 'reconstruction method') according to an embodiment of the present disclosure.
Figure 7:
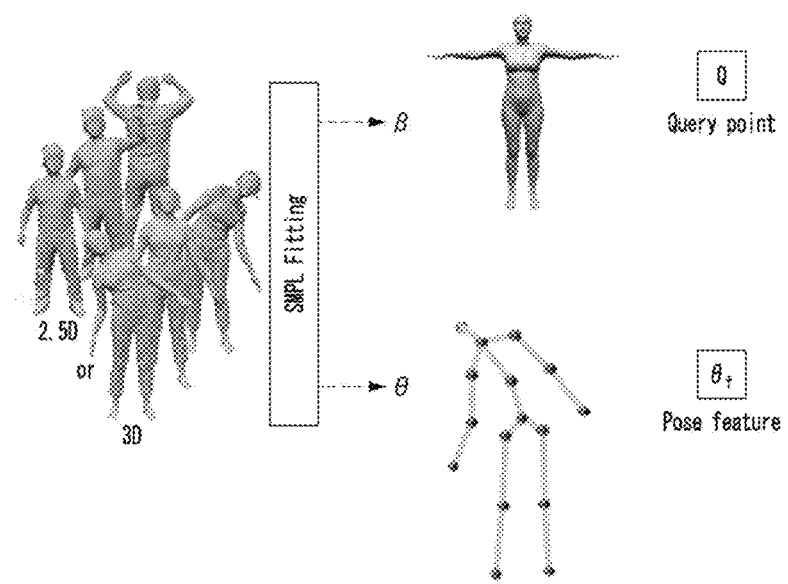
FIG. 7 is a diagram illustrating a preprocessing process of the reconstruction method of FIG. 6.
Figure 8:
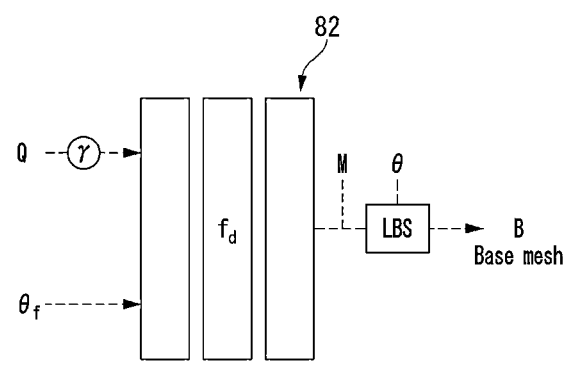
FIG. 8 is a diagram illustrating a learning process using pose-dependent local deformation of the reconstruction method of FIG. 6.
Figure 9:
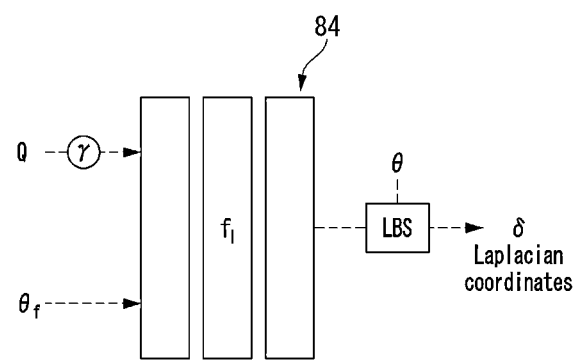
FIG. 9 is a diagram illustrating a learning process using neural surface Laplacian function of the reconstruction method of FIG. 6.
Figure 10:
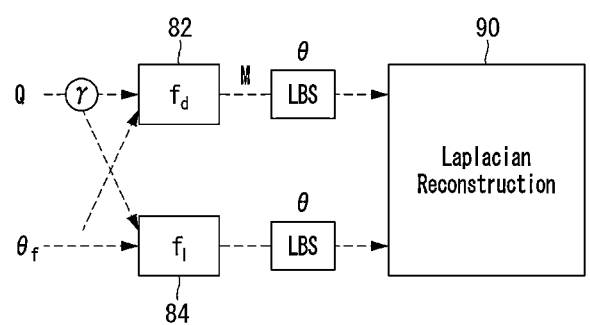
FIG. 10 is a diagram illustrating an inference process and Laplacian reconstruction process of the reconstruction method of FIG. 6.

FIG. 6 is a flowchart illustrating a detailed 3D object reconstruction method (briefly referred to as 'reconstruction method') according to an embodiment of this disclosure. FIG. 7 is a diagram illustrating a preprocessing process of the reconstruction method of FIG. 6. FIG. 8 is a diagram illustrating a learning process using pose-dependent local deformation of the reconstruction method of FIG. 6. FIG. 9 is a diagram illustrating a learning process using neural surface Laplacian function of the reconstruction method of FIG. 6. FIG. 10 is a diagram illustrating an inference process and Laplacian reconstruction process of the reconstruction method of FIG. 6.

With reference to FIG. 6 to FIG. 10, the reconstruction system 60 implementing the reconstruction method may include a first module 61, a second module 63, a third module 65, a fourth module 67, and a fifth module 69.

The first module 61 may generate shape parameters β and pose parameters θ from a 2.5D or 3D input point cloud sequence through SMPL fitting, as shown in FIG. 7. The shape parameters may be used to generate the skinned body mesh M. The vertices of the skinned body mesh based on the shape parameters may be expressed as query points Q on the standard neutral SMPL model with a T-pose. The pose parameters may also be used to generate pose features $θ_f$ to be described later. The pose features $θ_f$ may include unseen pose (Refer to FIG. 14). The first module 61 may be referred to as a preprocessing module.

The second module 63 may obtain a first intermediate mesh through the deformation function 82 taking as input the query points and pose features and output a base mesh B by performing a linear blend skinning on the first intermediate mesh based on a neural network $f_d$, as shown in FIG. 8. Here, the query points Q may be converted to high-dimensional vectors through positional encoding γ. The neural network 82 may include a surface function using a multi-layer perceptron (MLP) that computes vertex displacements for the posed skin body M.

The posed skin body M is referred to above as the skinned body mesh M. The neural network 82 may be referred to as a neural surface Laplacian function. The second module 630 may also combine the first intermediate mesh and the skinned body mesh M and process the combined mesh through the linear blend skinning (LBS) applied with the pose parameters θ, and thereby generating the base mesh B. The base mesh B may be optimized in a way that minimizes the chamfer loss. The second module 63 may be referred to as a pose-dependent local deformation processing module.

The third module 65 may obtain a second intermediate mesh through the neural surface Laplacian function $f_l$ taking as input the query points Q and pose features $θ_f$ and output Laplacian coordinates δ by performing a linear blend skinning on the second intermediate mesh, as shown in FIG. 9. Here, the query points Q may be converted to high-dimensional vectors through positional encoding γ. The neural surface Laplacian function 84 may include a surface function using a multi-layer perceptron (MLP) that predicts Laplacian coordinates & by encoding the surface details of a clothed human model. The third module 65 may also process the second intermediate mesh through the linear blend skinning (LBS) applied with the pose parameters θ and thereby generating the Laplacian coordinates δ. The Laplacian coordinates δ may be optimized in a way that minimizes the L2 loss. The third module 65 may be referred to as a neural surface Laplacian function processing module.

The fourth module 67 may obtain a first intermediate mesh through the deformation function 82 taking as input the query points and pose features and output the base mesh B by performing a linear blend skinning on the first intermediate mesh, as shown in FIG. 10. Here, the query points Q may be converted to high-dimensional vectors through positional encoding γ. The fourth module 67 may also combine the first intermediate mesh and the skinned body mesh M and process the combined mesh through the linear blend skinning (LBS) applied with the pose parameters θ.

The fourth module 67 may also obtain a second intermediate mesh through the neural surface Laplacian function 84 taking as input the query points and pose features and output Laplacian coordinates by performing the linear blend skinning on the second intermediate mesh. The fourth module 67 may be referred to as an inference module that integrally infers the base mesh and Laplacian coordinates using the trained second module 82 and the trained third module 84.

The fifth module 69 may perform Laplacian reconstruction by receiving the base mesh and Laplacian coordinates for vertices of the base mesh from the fourth module, i.e., the pose-dependent local deformation processing module and neural surface Laplacian function processing module equipped in the fourth module 67, and combining the Laplacian coordinates in a way that maintains the full body model corresponding to the base mesh. Here, the base mesh may be an optimized base mesh or a refined base mesh. Similarly, the Laplacian coordinates may be optimized Laplacian coordinates or estimated Laplacian coordinates. The fifth module 69 may be referred to as a reconstruction module or Laplacian reconstruction module 90.

The fourth module 67 and fifth module 69 are not limited to separate module forms and may take the form of a single module. In the case where the fourth module 67 and the fifth module 69 take the form of a single module, it may be referred to as an inference and reconstruction module.

Figure 11:
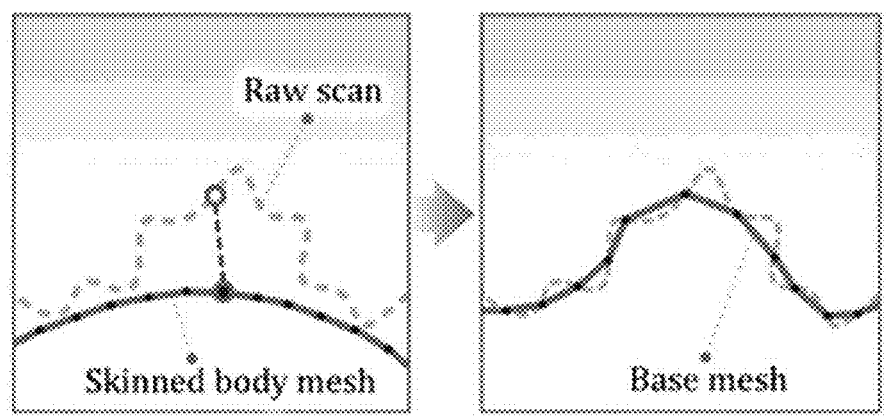
FIGS. 11 to 13 are diagrams illustrating the inference process and Laplacian reconstruction process of FIG. 10.
Figure 12:
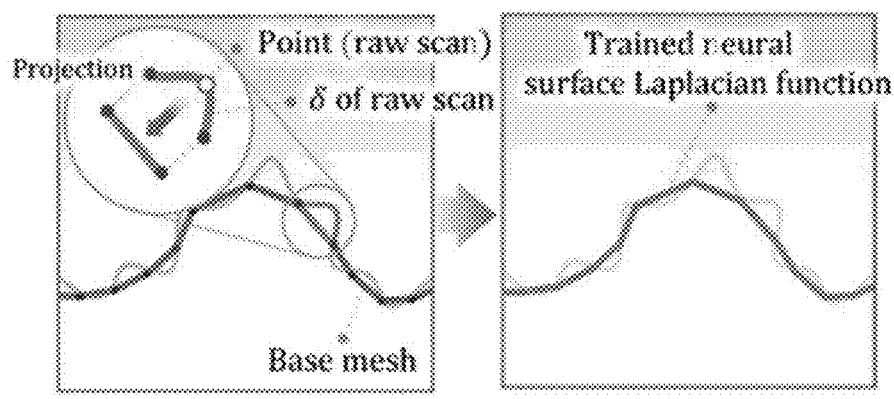
Figure 13:
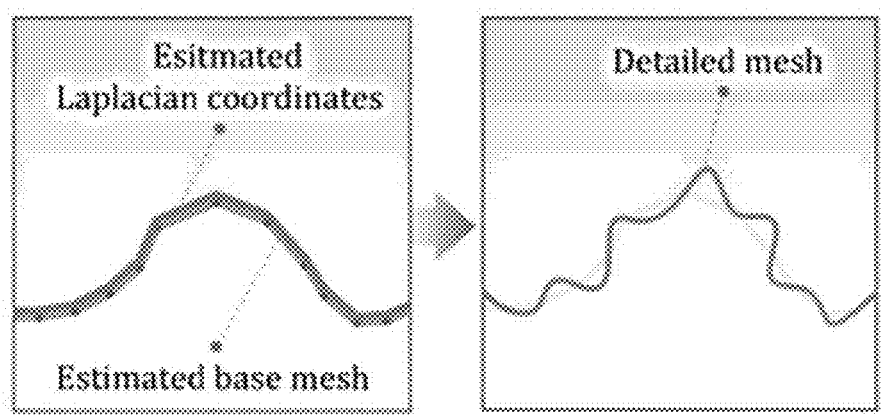

FIGS. 11 to 13 are diagrams illustrating the inference process and Laplacian reconstruction process of FIG. 10.

With reference to FIG. 11, in the inference process, the reconstruction system may generate a base mesh by minimizing the chamfer loss between the raw scan of the input point cloud and the skinned body mesh obtained through the pose-dependent local deformation processing module, thereby reducing the gap between the row scan of the input point cloud and the skinned body mesh. In the case, the details of the generated base mesh may not yet sufficiently reflect the details of the raw scan.

Therefore, the reconstruction system, as shown in FIG. 12, may project each point in the input point cloud onto the base mesh using the projection operation that projects from a point of the raw scan and the Laplacian coordinates & of the raw scan to a pose-dependent base mesh. The position of the above-mentioned each point may be determined by the barycentric coordinates in a triangle of the base mesh, so the reconstruction system can easily compute the query point, skinning weights, and pose feature using the barycentric weights. The projection operation may operate as the trained neural surface Laplacian function.

In other words, the reconstruction system may determine the relationship between the points of the raw scan and surrounding Laplacian coordinates and the corresponding pose-dependent base mesh. That is, the reconstruction system may determine whether the corresponding part of the raw scan is arranged in a concave form or a convex form with respect to the base mesh.

Furthermore, the reconstruction system, as shown in FIG. 13, may generate a detailed mesh with a form similar to the raw scan using the reconstruction module. For this, the reconstruction module may take the base mesh and the Laplacian coordinates for the vertices of the base mesh as inputs, and reconstruct the estimated Laplacian coordinates based on the estimated base mesh using the neural network surface function.

Figure 14:
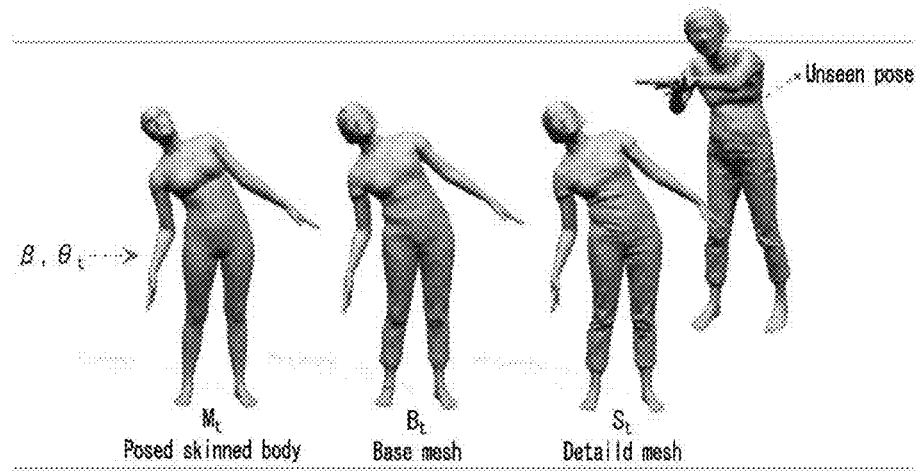
FIG. 14 is a diagram illustrating a skinned body, a base mesh, and a detailed mesh with a pose applicable to the reconstruction method of FIG. 6.

FIG. 14 is a diagram illustrating a skinned body, a base mesh, and a detailed mesh with a pose applicable to the reconstruction method of FIG. 6.

With reference to FIG. 14, the reconstruction system implementing the reconstruction method may be configured to obtain a posed skinned body $M_t$ from the shape parameters $\beta$ and pose parameters $\theta_t$ obtained from the input point cloud, to obtain a base mesh $B_t$ based on the posed skinned body $M_t$, and to obtain a detailed mesh $S_t$ based on the base mesh $B_t$. The posed skinned body $M_t$ may be referred to as a template mesh.

Here, the reconstruction system, when generating each mesh, may use a neural network taking as input the pose features including an unseen pose and query points, i.e., modeling continuous Laplacian coordinates on the 3D surface using the surface function.

Figure 15:
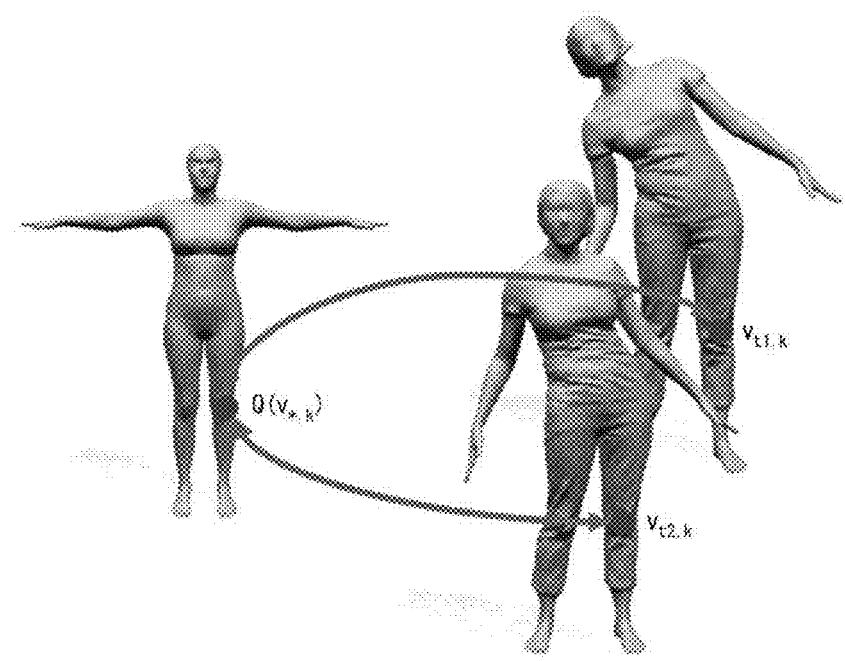
FIG. 15 is a diagram illustrating query points as input parameters for a neural surface Laplacian function applicable to the reconstruction method of FIG. 6.
Figure 16:
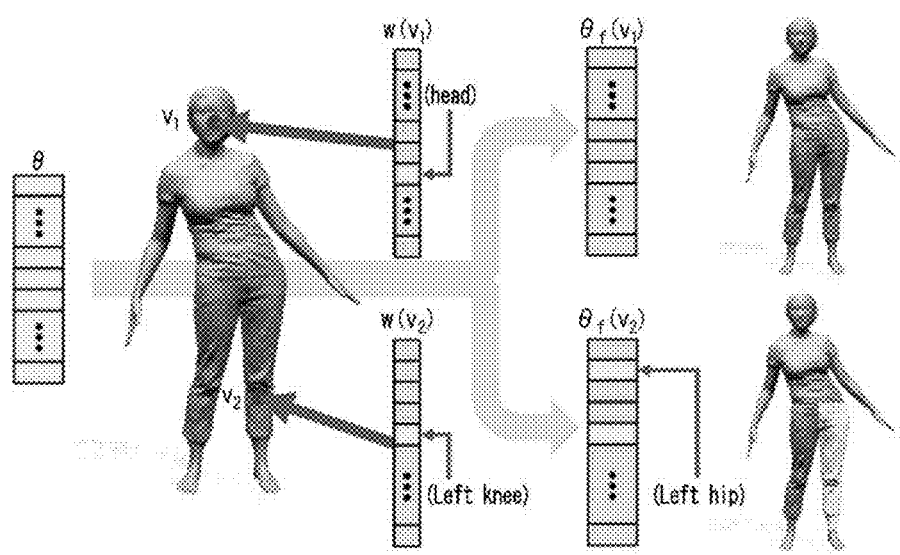
FIG. 16 is a diagram illustrating pose features as input parameters for a neural surface Laplacian function applicable to the reconstruction method of FIG. 6.
Figure 17A:
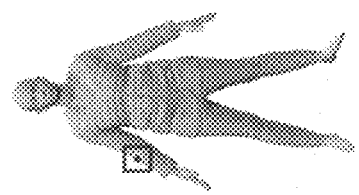
FIGS. 17(a) to 17(c) are diagrams illustrating GT-approximated Laplacian coordinates applicable to the reconstruction method of FIG. 6.
Figure 17B:
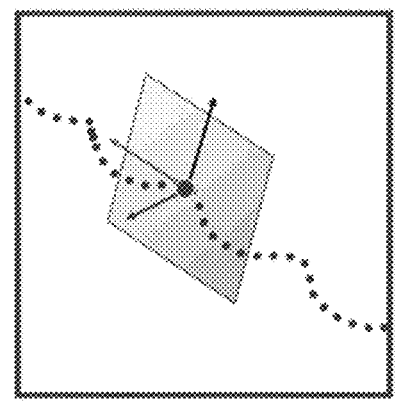
Figure 17C:
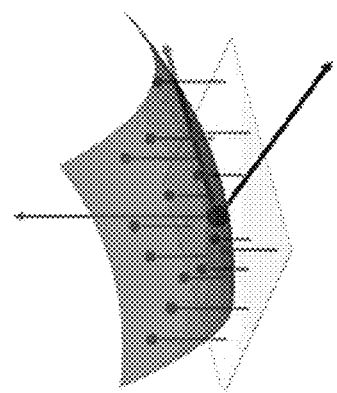
Figure 18:
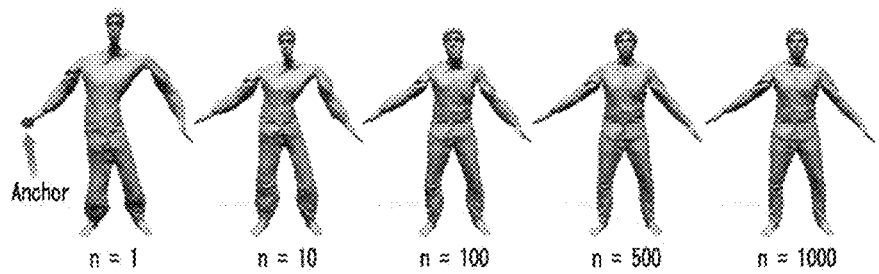
FIG. 18 is a diagram illustrating the influence of the number of anchor points applicable to the reconstruction method of FIG. 6.
Figure 19:
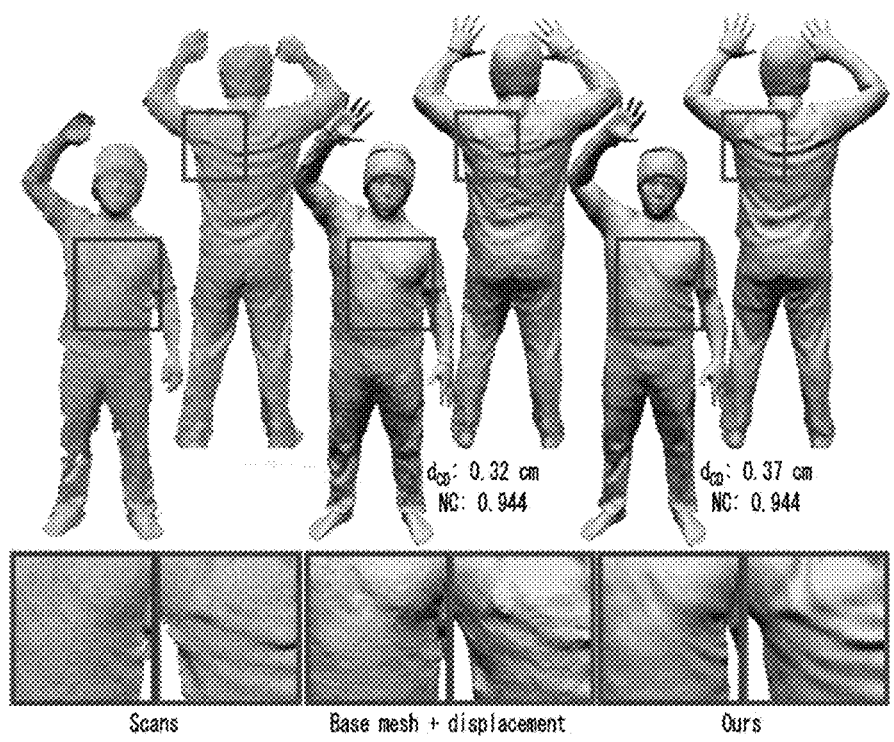
FIG. 19 is a diagram illustrating the result of using a regularization-free displacement function on a base mesh as the result of using an additional function applicable to the reconstruction method of FIG. 6.

FIG. 15 is a diagram illustrating query points as input parameters for a neural surface Laplacian function applicable to the reconstruction method of FIG. 6. FIG. 16 is a diagram illustrating pose features as input parameters for a neural surface Laplacian function applicable to the reconstruction method of FIG. 6. FIGS. 17(a) to 17(c) are diagrams illustrating GT-approximated Laplacian coordinates applicable to the reconstruction method of FIG. 6. FIG. 18 is a diagram illustrating the influence of the number of anchor points applicable to the reconstruction method of FIG. 6. And, FIG. 19 is a diagram illustrating the result of using a regularization-free displacement function on a base mesh as the result of using an additional function applicable to the reconstruction method of FIG. 6.

As described above, the reconstruction system of this disclosure may estimate the Laplacian coordinates of each vertex on the surface of a 3D model by defining a surface function to introduce Laplacian coordinates into the 3D object reconstruction process. To transform inverse the Laplacian coordinates estimated from the surface function into mesh form, the connectivity structure of the mesh and the weights of the Laplace-Beltrami operator are required. Therefore, the reconstruction system may predefine the connectivity structure of the mesh by defining a surface function on the template model mesh, and add a template mesh deformation step to approximate the necessary weights before optimizing the surface function.

The model of the template mesh may be implemented by a parametric model. The parametric model provides a skinned body mesh from pose and shape parameters. The skinned body mesh is in a state lacking details such as body surface curves or clothing folds and may be referred to as a smooth body mesh. The skinned body mesh corresponds to the template model mesh and may be referred to as a posed skinned body. The posed skinned body refers to a skinned body with a pose.

To obtain the skinned body mesh, pose parameters and shape parameters may be obtained through correspondence point matching and optimization between the given point cloud and the template mesh. Here, the shape parameters determine the size or length of the body of the object, while the pose parameters represent the degree of joint bending through linear blend skinning (LBS). The linear blend skinning associated with the pose parameters may be calculated by Equation 7.

$$LBS_\theta(v) = \left(\sum_j w_j(v) T_j(\theta)\right) v \quad \text{[Equation 7]}$$

In Equation 7, $\theta$ denotes the pose parameters, $w_j$ denotes the weight for the j-th joint, and $T_j$ denotes the transformation matrix for the j-th joint, respectively. Through Equation 7, each vertex v of the T-pose mesh changes in position based on the degree of bending of the joints, allowing the final neural network model to adopt the appropriate pose.

Once the skinned body mesh is obtained, the skinned body mesh may be deformed to fit closely to the given point cloud. For this purpose, the reconstruction system of the present disclosure may implement and use a neural network, such as a multi-layer perceptron (MLP), to represent the transformation function $f_d$. The neural network may encompass deep neural networks. The position v' of vertices in the skinned body mesh transformed through the neural network may be determined by the transformation function of Equation 8.

$$v' = LBS_\theta(v + f_d(v, \theta)) \quad \text{[Equation 8]}$$

As in Equation 8, the input to the transformation function $f_d$ includes a vertex v on the template mesh and pose parameters $\theta$, and by utilizing such a transformation function, it is possible to estimate various transformation vectors for each vertex on the template mesh depending on the pose.

The estimated transformation vectors may be used to determine the final vertex positions by being added in the T-pose, i.e., the canonical space and then applying joint movements. The aforementioned transformation function may be optimized by reducing the energy function $E_d$, calculated by Equation 9, in the manner of aligning the positions of transformed vertices well with the given point cloud for each frame.

$$E_d = \sum_i d_{CD}(p_i, \mathcal{B}) + \lambda E_r \quad \text{[Equation 9]}$$

In Equation 9, $d_{CD}$ denotes the chamfer distance between the given i-th point $p_i$ and the base mesh. $E_r$ denotes the regularization function to reduce noise in the transformation function or optimized transformation function, and $\lambda$ denotes the weight to reduce noise in the transformation function. B denotes the mesh composed of transformed vertices v'. In this disclosure, the mesh composed of transformed vertices v' is referred to as the base mesh.

The aforementioned regularization function $E_r$ may be define by Equation 10.

$$E_r = \sum_k \left| v'_k - \frac{\sum_{j \in \mathcal{N}(k)} v'_j}{|\mathcal{N}(k)|} \right|^2 \quad \text{[Equation 10]}$$

After the transformation function $f_d$ is optimized, the reconstruction system may obtain a surface function $f_l$ that estimates Laplacian coordinates. The surface function $f_l$ may, like the transformation function $f_d$, be implemented with a neural network, such as a multi-layer perceptron, taking a point on the template mesh and pose parameters as input.

Before optimizing the surface function $f_l$, it may be necessary to create training pairs required for optimization. Training pairs are needed to find corresponding points for each point that does not exactly match a point on the base mesh, as the input value of the surface function is a point on the template mesh.

To create training pairs, the reconstruction system may find the point where the perpendicular from each point p to the base mesh B intersects the base mesh and then find a point p on the base mesh that corresponds to this point. Subsequently, the surface function $f_l$ may be optimized through an energy function $E_l$ defined by Equation 11.

$$E_l = \sum_i |LBS_\theta(f_l(\bar{p}_i, \theta)) - \delta_i|^2 \qquad \text{[Equation 11]}$$

In Equation 11, the energy function $E_l$ may be obtained by performing linear blend skinning (LBS) on the value obtained by subtracting the values obtained by the Laplacian coordinates $\delta_i$ of the i-th point from the surface function $f_l$ and then squaring the absolute values of the values obtained by subtracting the Laplacian coordinates. Here, the linear blend skinning takes into account the pose parameters, and the surface function $f_l$ takes as input the i-th point $\bar{p}_i$ projected onto the base mesh from the input point cloud and the pose-dependent parameter $\theta$.

In the present embodiment, the surface function $f_l$ may be obtained by acquiring the Laplacian coordinates $\delta_i$ in the T-pose and then rotates the Laplacian coordinates through linear blend skinning.

Compared to global coordinates, which represent the exact spatial location, Laplacian coordinates may naturally encode local shape information such as the size and direction of local details. Therefore, the reconstruction system of the present embodiment may use the properties of these Laplacian coordinates for shape reconstruction. This property may be referred to as Laplacian reconstruction. That is, the reconstruction system may reconstruct the target details of the subdivided base mesh by extracting and encoding local details from the input scan data using Laplacian coordinates, rather than using Laplacian coordinates to maintain the local shape during the editing process by restricting the mesh to be edited to follow the encoded Laplacian coordinates.

Hereinafter, descriptions are made of the posed skinned mesh and base mesh in more detail.

Skinned Body Acquisition

The reconstruction system of the present embodiment may be configured to start by creating a skinned body. The skinned body may include a skinned human body and correspond to a template mesh.

The reconstruction system may adopt the SMPL model, which can easily manipulate 3D human shapes using shape-dependent parameters $\beta$ and pose-dependent parameters $\theta$. The shape-dependent parameters $\beta$ may be referred to as shape parameters, and the pose-dependent parameters $\theta$ may be referred to as pose parameters.

The SMPL model supports rigging and skinning. Therefore, the template mesh may be easily deformed into an arbitrary pose. In addition, the reconstruction system may calculate the deformation of the template mesh using linear blend skinning (LBS) by Equation 12. Equation 12 is the same as Equation 7 above.

$$LBS_\theta(v) = \left(\sum_j w_j(v) T_j(\theta)\right) v \qquad \text{[Equation 12]}$$

In equation 12, $j(\leq J)$ denotes the index of the joint, and J is the number of joints. $T_j(\theta)$ denotes the 4×4 rigid transformation matrix for the j-th joint, $w_j(v)(\in R^j)$ is the skinning weight vector of the vertex coordinates v predefined by the SML model. The SMPL model may include the canonical neutral SMPL model. The vertex coordinates v are homogeneous vertex coordinates of the base mesh, and $R^j$ denotes all of transformation matrix for the joints. That is, the deformation of the joints may be performed by applying Equation 12 to all the vertices of the base mesh.

The reconstruction system may estimate the shape parameters $\beta$ and pose parameters $\theta_t$ using an SMPL model in the T-pose state, and then align the SMPL model to each input point cloud. A skinned body composed of the aligned SMPL model, i.e., a posed skinned body with a deformed pose, may be generated to fit well to the input point cloud.

When generating the posed skinned body, to obtain the initial geometric correspondence, the reconstruction system may apply deep virtual markers to the SMPL model and the input point cloud. In addition, when color images are available, the accuracy of the point correspondence may be further improved by using the OpenPose technique. In addition, to obtain the shape parameters and pose parameters for the posed skinned body, it may be possible to perform optimization using the initial correspondence between the SMPL model and the input point cloud and then minimize the correspondence alignment error and the chamfer distance $l_2$ together. Furthermore, a smoothness regularization term may be added to the corresponding equations or functions in the time domain to allow the pose parameters of SMPL to change gradually during optimization.

In the present embodiment, the SMPL model places vertices in the face region with an uneven distribution to provide detailed facial features. However, this distribution does not match the almost uniform point distribution of the input raw scan data. Therefore, the reconstruction system may re-mesh the facial of the SMPL model and assign skinning weights for the new vertices based on the closest raw vertices.

Pose-Dependent Base Mesh

In the present embodiment, it is assumed that a skinned body mesh approximating the input frame was obtained in the previous step. In the present embodiment, the reconstruction system obtains a pose-dependent base mesh $B_t$ (hereinafter briefly referred to as 'base mesh') by combining pose-dependent local deformation with the skinned body mesh to fit the SMPL model more closely to the input point cloud.

The vertex v' of the pose-dependent base mesh may be expressed as Equation 13.

$$v' = LBS_\theta(v + f_d(Q(v), \theta_f(v))) \qquad \text{[Equation 13]}$$

According to equation 13, before performing the joint deformation using the deformation function $f_d$ which is a function of the position parameters, the reconstruction system may apply the displacement to the vertices v of the T-pose SMPL mesh using the optimized shape parameters $\beta$. The LBS function may be implemented as a neural network such as a multilayer perceptron (MLP) to handle pose-dependent local deformation. The LBS function may take the query point $Q(\cdot)$ and point-wise pose features $\theta_f(\cdot)$ as input. Such pose-dependent local deformation is useful for handling large shape variations in the input scan data.

To optimize the deformation function $f_d$ for pose-dependent local deformation, an energy function may be defined as Equation 14.

$$E_d = \sum_t \sum_i \mu_{t,i} \times d_{CD}(p_{t,i}, B_t) + \lambda_r E_r \qquad \text{[Equation 14]}$$

In Equation 14, $\mu_{t,i}$ denotes the point-wise weight at frame t, $d_{CD}$ (A, B) denotes the average chamfer distance from A to B, $P_{t,i}$ is the target points belonging to all points $p_t$ in the point cloud at frame t, and $B_t$ denotes the base mesh to which the transformation function $f_d$ and the pose parameters $\theta_t$ corresponding to pose-dependent local deformation are applied. $\lambda_r$ denotes the weight parameter, and $E_r$ denotes a Laplacian regularizer. The Laplacian regularizer may be referred to as a Laplacian regularization function. The base mesh $B_t$ may be expressed as Equation 15.

$$B_t = B_{\theta_t} = \{V'_{\theta_t}, F\}, \text{ where } V'_{\theta_t} = \{v'_{t,k} | k \leq K\} \qquad \text{[Equation 15]}$$

In Equation 15, $v'_{t,k}$ denotes the kth vertex that is deformed to $\theta_t$ by Equation 13.

For simplification, the average term dividing the sum of the chamfer distance by the number of points may be omitted in Equation 14. That is, in equation 14, the point-wise weight $\xi_{t,i}$ is used to effectively utilize the geometric details captured in the input depth image. In general, the details of objects close to the camera are captured better than those of objects far away, and it is better to give more weight to the input points closer to the camera. Therefore, the point-wise weight may be defined as Equation 16.

$$\mu_{t,i} = e^{-c|z_{t,i}|} \qquad \text{[Equation 16]}$$

In Equation 16, $Z_{t,i}$ is the depth value of $P_t$ at frame t, and the parameter c may be set to 2. For example, when there is a series of point clouds with unclear distances to the camera as input, the point-wise weight $\mu_{t,i}$ may be set to 1.

To avoid noisy artifacts, the Laplacian regularizer $E_r$ is used in Equation 14. Such a Laplacian regularizer may be defined as Equation 17.

$$E_r = \sum_t \sum_k \left| v'_{t,k} - \frac{\sum_{j \in N(k)} v'_{t,j}}{|N(k)|} \right|^2 \qquad \text{[Equation 17]}$$

In Equation 17, $\mathcal{N}(k)$ is the set of adjacent vertices of the k-th vertex. $E_r$ smoothly regularize the shape of the base mesh $B_r$. During training, the reconstruction system may collect the frame-wise energy of randomly sampled frames to compose the total energy and optimize the total energy using the Adam optimizer.

Unlike DSFN, the reconstruction system may optionally perform or not perform mesh subdivision for efficiency. Also, the topology of parametric models such as skinned multi-person linear (SMPL) topology applicable to the present embodiment is sufficient to represent rough meshes, smooth meshes, or rough and smooth meshes required for learning the neural surface Laplacian function.

Here, the rough and smooth meshes may be determined by the number of vertices and the surface depth.

The surface of a mesh tends to become rougher with a decrease in the number of vertices and smoother with a decrease in the average surface depth.

Neural Surface Laplacian Function

In order to reflect the fine-grained details of the input point cloud as much as possible in the reconstruction, a neural surface Laplacian function $f_l$ defined on the surface of the pose-dependent base mesh $B_t$ may be constructed. The neural surface Laplacian function may include neural networks such as multilayer perceptrons. The input to the neural surface Laplacian function is the same as the input to the surface function $f_d$ for pose-dependent local deformation. On the other hand, the output value of the neural surface Laplacian function $f_l$ is approximate Laplacian coordinates, but the surface function $f_d$ for pose-dependent local deformation generates a displacement vector as its output.

The reconstruction system may use query points in the inputs of the two functions $f_d$ and $f_l$ to neutralize the shape deformation of the base meshes in different frames for different targets. The query point $Q(\cdot)$ may be defined as a 3D point of the T-pose SMPL model. The T-pose SMPL model may be a standard neutral SMPL module. In addition, two base meshes $B_{t1}$ and $B_{t2}$ and their corresponding k-th vertices $v_{t1,k}$ and $U_{t2,k}$ may be considered for the same target across different frames.

As illustrated in FIG. 15, the 3D positions of the two vertices $v_{t1,k}$ and $v_{t2,k}$ on the mesh may be different, but their query points $Q(V^*_k)$ may be defined to be the same since they share the same vertex index. Such query points may be defined as 3D points of a parametric model. The parametric model may include a standard neutral SMPL model, such as the T-pose SMPL model.

With these query points, the reconstruction system may define the vertices of the base mesh representing different objects as identical. Additionally, with the query points, it is possible to define arbitrary points on the base mesh, excluding the vertices, using the centroid coordinates of the mesh triangles.

Once the query points are determined, the query points may be converted to high-dimensional vectors through positional encoding $\gamma$. The high-dimensional vector may encompass vectors of several dimensions or tens of dimensions, such as a 10-dimensional vector.

Hereinafter, a description is made of the pose features applicable to the reconstruction system of this disclosure. First, for the query points, the two functions $f_d$ and $f_l$ implemented as neural networks need to estimate pose-dependent deformation and Laplacian coordinates, respectively. To provide this pose dependency, the reconstruction system may include pose parameters $\theta$ in the input to each neural network.

Meanwhile, query points are not affected by all joints, but are closely related to the surrounding joints. For example, the joint angle of the shoulder is not very related to the local detail of the leg. In more detail, as illustrated in FIG. 16, in order to utilize the correlation between query points and joint angles in the pose parameters $\theta$, the reconstruction system may convert the pose parameters $\theta$ into vertex-wise pose features $\theta_f(v)$ that only maintain the relevant joint angles for the query points.

That is, the reconstruction system may apply joint association weight maps $W \in R^{J \times J}$ and/or skinning weights $w(v) \in R^J$ to the initial pose parameters $\theta \in R^{J \times 3}$, and as a result, the vertex-wise pose features $\theta_f(v)$ may include the first pose feature $\theta_f(v_1)$ for the head $v_1$ and the second pose feature $\theta_f(v_2)$ for the left leg $v_2$. The pose features may include, for example, the pose feature of the left knee and the pose feature of the left hip.

The pose features used as the inputs to the neural networks may be defined by Equation 18.

$$\theta_f(v) = \lceil \text{diag}(Ww(v)) \rceil \quad \text{[Equation 18]}$$

In Equation 18, diag(·) donates an operation that can convert an input vector to a diagonal matrix, [·] is an element-wise ceiling operation, and W denotes a weight map. Regarding the weight map, for example, the details of the head may not be correlated with the joints of the model being reconstructed, and the details of the legs may be affected by all the joints near the legs. Therefore, the reconstruction system may set the association weights for all the joints around the head to 0 and set the association weights for the joints around legs to relatively high values.

Training Pairs

To train the neural surface Laplacian function $f_l$, the reconstruction system may calculate the ground-truth (GT) approximate Laplacian coordinates of the scan points and localize the calculated coordinates to the corresponding query points on the SMPL model.

To calculate the GT Laplacian coordinate approximations, the reconstruction system may use an approximation method for calculating Laplacian coordinates from unconnected scan points. That is, the reconstruction system may first locally fit a quadratic polynomial surface to each point using the moving least squares method. In this case, it is possible to use 20 to 30 neighboring points for local surface fitting.

As shown in FIGS. 17(a) to 17(c), the reconstruction system may define the vertices on the mesh of the scan data (see FIG. 17(a)) as approximate Laplacian coordinates in a local coordinate system (see FIG. 17(c)) in the continuous domain using a projection operator (see FIG. 17(b)), unlike the conventional mesh editing method. The conventional mesh editing method represents Laplacian coordinates in the discrete domain using mesh vertices. As the above mentioned, the reconstruction system of this disclosure utilizes the advantage of the pose-dependent base mesh to apply Laplacian coordinates to discrete meshes.

In addition, for localization, the reconstruction system may use a projection method. That is, even when the base mesh $B_t$ is closely matches the input point cloud, the points may not be accurately aligned on the base mesh. Therefore, to obtain query points corresponding to the base mesh for the input point cloud, the reconstruction system may project each point p of the input point cloud $P_t$ onto the base mesh. The point p projected onto the base mesh may be expressed by Equation 19.

$$\bar{p} = \prod(B_t, p) \quad \text{[Equation 19]}$$

In Equation 15, Π denotes the projection operation from a point to the pose-dependent base mesh in the local coordinate system as shown in (b) of FIG. 17.

Since the position of the projected point $\bar{P}_{t,i}$ at a specific frame t is determined by the centroid coordinates located within the triangle of the point cloud, the reconstruction system may easily calculate the query points, skinning weights, and pose features using the centroid weights.

Optimization

The reconstruction system may estimate the Laplacian coordinates using the neural network function $f_l$ for a given surface point $\bar{p}$ and pose θ. The Laplacian coordinates δ' estimated by the neural network function $f_l$ may be expressed Equation 20.

$$\delta'(\bar{p}) = LBS_\theta(f_l(Q(\bar{p}), \theta'(\bar{p}))) \quad \text{[Equation 20]}$$

The estimation is conducted in the canonical space, and the result of the estimation is transformed into the space with pose. It is essential to work in the canonical space because the Laplacian coordinates are not affected by rotation. In addition, the reconstruction system may discard the transformation part of Equation 13 as in Equation 20 because the Laplacian coordinates are differential quantities. The estimated Laplacian coordinates δ' are non-uniform Laplacian coordinates.

The neural network may be trained by formulating a point-wise energy function for these estimated Laplacian coordinates as in Equation 21. The neural network may include a multilayer perceptron.

$$E_l = \sum_t \sum_i \mu_{t,i} |\delta'_{t,i} - \delta_{t,i}|^2 \quad \text{[Equation 21]}$$

In Equation 21, $\delta'_{t,i}$ denotes the Laplacian coordinates of the projected surface points $\bar{P}_{t,i}$ predicted by the neural network function $f_l$ using Equation 20, $\delta_{t,i}$ denotes the ground-truth approximate Laplacian coordinates of $p_{t,i}$, and $\mu_{t,i}$ denotes the weights used in Equation 14.

During training, the reconstruction system may calculate the total energy by summing the point-wise energy of randomly sampled input points and optimize the total energy using the Adam optimizer.

Laplacian Reconstruction

Once all the optimization steps are completed, the base mesh for the given pose and the Laplacian coordinates of each point on the surface of the base mesh may be obtained. That is, the last step is to obtain the final vertex position by inverting the Laplacian coordinates.

On the other hand, when the number of vertices in the base mesh is too small to fully express the details, the reconstruction system may perform mesh subdivision on the base mesh before inverting the Laplacian coordinates.

Mesh subdivision may be performed by creating a new vertex at the midpoint of each edge in the triangle and connecting those vertices to form new edges. That is, the number of triangles increases fourfold each time the mesh subdivision (hereinafter briefly referred to as 'mesh subdivision') is performed.

After mesh subdivision, the Laplacian coordinates of each of the increased vertices are obtained, and the inverse transformation of the Laplacian coordinates may be performed to minimize the inverse transformation energy E (u') defined by Equation 22.

$$E(u') = \sum_k \|\Delta(u'_k) - \delta_k\|^2 + \sum_{k \in anchor} \|u'_k - u_k\|^2 \quad \text{[Equation 22]}$$

In equation 22, $u_k$ denotes the kth vertex of the subdivided base mesh, and $\delta_k$ denotes the Laplacian coordinates estimated by the surface function. anchor denotes the indices of the vertices that are fixed when solving Equation 22 in the form of a linear equation. Δ denotes the Laplace-Beltrami operator, which can be accurately obtained from the final mesh, but since the final mesh does not exist before the reconstruction, it may be approximated from the base mesh.

The Laplace-Beltrami operator $\Delta B(u'_k)$ of the base mesh may be defined by Equation 23.

$$\Delta B(u'_k) = \frac{\cot(\alpha)}{\alpha_k}\left(|N(k)|u'_k - \sum_{i\in N(k)} u'_j\right) \quad \text{[Equation 23]}$$

After converting the Laplace-Beltrami operator $\Delta B(u'_k)$ in the base mesh of Equation 23 into matrix form and solving the linear equations, the final mesh may be obtained.

The detailed 3D object reconstruction system of this disclosure (hereinafter briefly referred to as "reconstruction system") can well preserve the details of the given input point cloud because of fundamentally using Laplacian coordinates containing surface details.

In addition, the reconstruction system can recover the initial mesh from the Laplacian coordinates of a vertex by fixing the position of one vertex as an anchor and solving the linear system. Meanwhile, the reconstruction system may consider that one anchor is not enough to reconstruct the accurate final surface of the mesh because the Laplacian coordinates are approximations predicted by the neural surface Laplacian function $f_l$ that are not directly calculated from the final surface (S) of the mesh. That is, the reconstruction system can set a sufficient number of anchor points as boundary conditions to improve the accuracy of the reconstruction. In the present embodiment, a set of n vertices may be pre-selected by uniformly sampling vertices from the SMPL model as anchors, as in Equation 22. n may be 800, but is not limited to this.

FIG. 18 shows the exemplary reconstruction results with various numbers n of anchor points, such as 1, 10, 100, 500, and 1000. When the number of anchor points used for the reconstruction is too small, specifically 500 or less, distortion may occur in the reconstruction result.

In addition, the anchor points must be as close to the input point cloud as possible because the anchor points are fixed to solve Equation 22. To achieve these properties, the reconstruction system may train the pose-dependent deformation function by setting and optimizing an additional energy term in conjunction with Equation 14. The additional energy function $E_a$ may be expressed Equation 24.

$$E_a = \lambda_a \sum_{t}\sum_{k\in anchor} d_{CD}(v'_{t,k}, P_t) \quad \text{[Equation 24]}$$

In Equation 24, $d_{CD}$ denotes the vertex-to-point cloud chamfer distance, $P_t$ denotes the input point cloud in frame t, and $\lambda_a$ denotes a weighting parameter. When the input is a depth map sequence, the weighting parameter may be applied only to the anchors visible from the camera viewpoint.

On the other hand, as shown in FIG. 19 by boxes for the left back and shoulder area and the right chest area of each human body, in the reconstruction step, the approach using Laplacian coordinates better preserves local geometric details than the approach using the absolute coordinates of mesh vertices. To verify this assertion, experiments may be conducted by modifying the neural surface Laplacian function to estimate displacement instead of Laplacian coordinates. The comparative example is configured to estimate displacement using the base mesh.

The experimental results show that the surface function of the present embodiment (Ours, right in FIG. 19) mimics the pose-dependent displacement map. That is, the reconstruction system of the present embodiment may optimize the surface displacement function using the same energy function as Equation 21, together with the change of Laplacian coordinates & for the displacement between the surface point and the scan point. Equation 21 does not have a regularization term, and the maximum function of the displacement function is used to encode surface details. Nevertheless, the resulting displacement function cannot properly capture structural details, resulting in a somewhat noisy surface (base mesh+displacement, middle in FIG. 19).

In contrast, the results using Laplacian coordinates may capture structural details (Ours, right in FIG. 19) from the input point cloud (Scans, left in FIG. 19). Quantitative results for the dataset, i.e., the Chamfer distance $d_{CD}$ and normal consistency NC, may be display as shown in FIG. 19. Here, the chamfer distance of the comparative example using the displacement is 0.32 cm, and the chamfer distance of the present example is 0.37 cm. Their normal consistencies are the same as 0.944.

The normal consistency may be calculated using the inner products of the GT normals of the input points and the normals of the corresponding points on the reconstructed surface. The results show slightly higher Chamfer distance errors than the displacement function but visually produce more satisfactory results.

Additionally, as mentioned earlier, the neural surface Laplacian function encodes detailed shape information using Laplacian coordinates defined on query points in a common domain. Consequently, evaluating the raw surface Laplacian function on the target pose-dependent base mesh allows easy transfer of shape details to a different model.

Moreover, the Laplacian coordinates predicted by the neural surface Laplacian function in the reconstruction step may be scaled to adjust the amount of reconstructed shape details. Detail sharpening is performed by multiplying the predicted Laplacian coordinates by a value greater than 1.0, while detail smoothing is performed otherwise.

Furthermore, in the present embodiment, the pose parameters used to evaluate the surface functions may be arbitrary. In the case of reconstructing a scanned animation sequence, the reconstruction system may use the pose parameters estimated from the input scans. Meanwhile, once the surface functions are optimized, it is possible to generate invisible poses of the subject using all other pose parameters. In this case, the validity of the shape details of the invisible poses is not guaranteed, but the reconstruction system of the present embodiment generates meaningful and useful results by additionally using the invisible poses. That is, the results of using the invisible poses show the natural variation of shape details depending on the motions.

In addition, the reconstruction system of this disclosure may be configured to allow all the models reconstructed in the reconstruction framework for the reconstruction method to have the same fixed topology through the refinement applied to the SMPL model. Then, it is possible to construct a common UV parametric domain on the UV plane of a UV coordinate system for texture mapping of the reconstructed models. In that case, the reconstruction system may initially transfer the texture from the Render People model to the T-posed standard neutral SMPL model using deep virtual markers. Then, the texture of the SMPL model may be shared with various models reconstructed through the common UV parametric domain.

Figure 20:
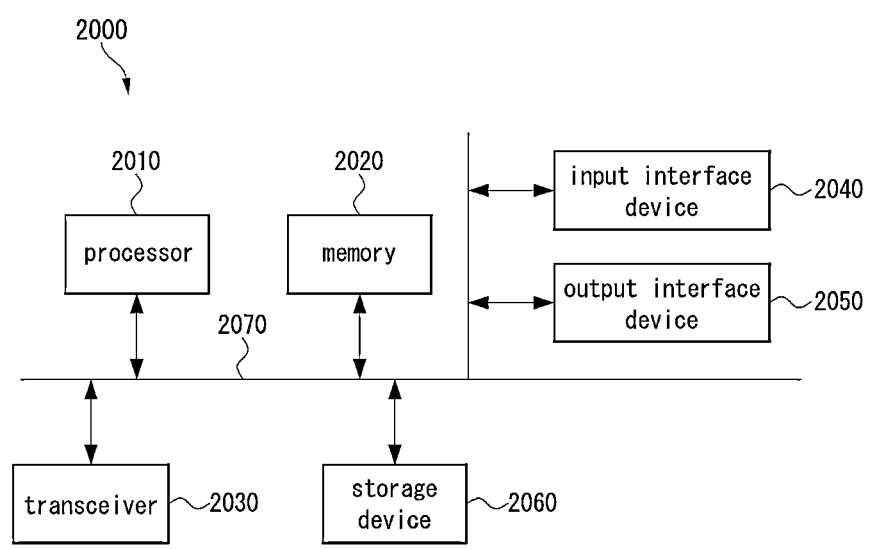
FIG. 20 is a schematic block diagram illustrating a detailed 3D object reconstruction apparatus (hereinafter 'reconstruction apparatus') according to another embodiment of the present disclosure.

FIG. 20 is a schematic block diagram illustrating a detailed 3D object reconstruction apparatus (hereinafter 'reconstruction apparatus') according to another embodiment of this disclosure.

With reference to FIG. 20, the reconstruction apparatus 2000 may include at least one processor 2010 and a memory 2020. The reconstruction apparatus 2000 may further include a transceiver 2030 connected to a network for communication. The reconstruction apparatus 2000 may further include an input interface device 2040, an output interface device 2050, and a storage device 2060. The components included in the reconstruction apparatus 2000 may communicate with each other through a bus 2070.

The processor 2010 may execute program instructions stored in at least one of the memory 2020 and the storage device 2060. The processor 2010 may refer to a central processing unit (CPU), a graphics processing unit (GPU), or a dedicated processor performing methods according to the embodiments of this disclosure.

The processor 2010 or memory 2020 may store at least part of the modules of the reconstruction apparatus of FIG. 6 in the form of program instructions. For example, the processor 2010 or memory 2020 may store the estimation module and Laplacian reconstruction module or may further include a preprocessing module. The estimation module may be replaced with a combination of a pose-dependent local deformation processing module and a neural surface Laplacian function processing module. The pose-dependent local deformation processing module and the neural surface Laplacian function processing module may be configured to learn the query points and pose features through a neural network to directly model continuous Laplacian coordinates.

The program instructions may include instructions for configuring at least one component software-wise to implement the Laplacian coordinates-based detailed 3D object reconstruction method in a software-wise manner, operate at least part of the components, and execute the functions of at least part of the components.

Each of the memory 2020 and the storage device 2060 may be configured as at least one of a volatile storage medium and a non-volatile storage medium. For example, the memory 2020 may be configured as at least one of a read-only memory (ROM) and random access memory (RAM).

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A detailed 3-dimensional (3D) object reconstruction method executed by a computing device, the method comprising:
   obtaining Laplacian coordinates with local details and direction and size information for curvatures on a 3D surface defined by an input point cloud;
   converting the Laplacian coordinates to absolute coordinates using a mesh for the 3D surface and Laplacian coordinates for each vertex of the mesh and a Laplace-Beltrami operator; and
   obtaining a detailed mesh reflecting details of the input point cloud using a surface function modeling continuous Laplacian coordinates on the 3D surface.

2. The method of claim 1, further comprising optimizing the surface function by transferring the 3D surface to a T-pose model, learning concave and convex shapes, and determining a direction.

3. The method of claim 1, further comprising:
   estimating Laplacian coordinates in a canonical space using the surface function directly modeling continuous Laplacian coordinates on the 3D surface; and
   rotating the Laplacian coordinates to a pose predetermined on the 3D surface; and calculating an energy function based on the difference in rotation of the Laplacian coordinates.

4. The method of claim 1, further comprising:
   estimating a deformation vector for each vertex on a template mesh based on the pose using a deformation function as a neural network; and
   generating a base mesh comprising deformed vertices obtained by deforming the vertices of a skinned body mesh based on the estimated deformation vector.

5. The method of claim 4, further comprising:
   defining a training pair of the surface function a point on the 3D surface and a vertex on the base mesh; and
   approximating a Laplace-Beltrami operator through the training pair.

6. The method of claim 1, further comprising obtaining a shape parameter and a pose parameter by performing correspondence point matching between the input point cloud and a template mesh.

7. The method of claim 6, further comprising obtaining a skinned body mesh corresponding to a posed skinned body from the pose parameter and the shape parameter through a parametric model.

8. The method of claim 7, further comprising deforming the skinned body mesh to fit closely to a give point cloud.

9. The method of claim 8, further comprising obtaining a base mesh comprising deformed vertices resulting from the deformation from the 3D surface.

10. The method of claim 9, further comprising obtaining a surface function by rotating the Laplacian coordinates, obtained on the parametric model, through linear blend skinning.

11. The method of claim 10, further comprising constructing a neural surface Laplacian function defined on the surface of the base mash to reflect the fine-level detail of the input point cloud as much as possible in reconstruction.

12. The method of claim 11, further comprising projecting each point of the input point cloud onto the base mesh to obtain query points in the input point cloud.

13. The method of claim 12, further comprising optimizing the total energy, obtained by summing point-wise energy of randomly sampled input points, through an Adam optimizer.

14. The method of claim 13, further comprising: obtaining the base mesh for a given pose and the Laplacian coordinates for each point on the surface of the base mesh after the optimizing; and obtaining final vertex positions by inversely transforming the Laplacian coordinates.

15. A detailed 3-dimensional object reconstruction apparatus, comprising:
 an estimation module configured to obtain Laplacian coordinates with local details and direction and size information for curvatures on a 3D surface defined by an input point cloud; and
 a reconstruction module configured to convert the Laplacian coordinates to absolute coordinates using a mesh for the 3D surface and Laplacian coordinates for each vertex of the mesh and a Laplace-Beltrami operator;
 wherein the reconstruction module obtains a detailed mesh reflecting details of the input point cloud using a surface function modeling continuous Laplacian coordinates on the 3D surface.

16. The apparatus of claim 15, wherein the surface function is obtained by rotating the Laplacian coordinates, obtained on a T-pose model, through linear blend skinning.

17. The apparatus of claim 15, wherein the reconstruction module optimizes the surface function by rotating the Laplacian coordinates with a pose predetermined on the 3D surface and calculates an energy function based on the difference in rotation of the Laplacian coordinates.

18. The apparatus of claim 15, wherein the estimation module estimates a deformation vector for each vertex on a template mesh based on a pose using a deformation function as a neural network and generates a base mesh comprising deformed vertices obtained by deforming the vertices of a skinned body mesh based on the estimated deformation vector.

* * * * *